United States Patent
Liu et al.

(10) Patent No.: US 8,990,261 B2
(45) Date of Patent: *Mar. 24, 2015

(54) QUICK DATA ENTRY LANES FOR TOUCH SCREEN MOBILE DEVICES

(71) Applicant: Oracle International Corporation, Redwood Shores, CA (US)

(72) Inventors: Xiaohan Liu, Foster City, CA (US); Chun-Yi Chen, Belmont, CA (US); Aylin Uysal, San Francisco, CA (US); Brent-Kaan William White, San Francisco, CA (US); Sivaroop Tejaswi Peesapati, Dublin, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/972,507

(22) Filed: Aug. 21, 2013

(65) Prior Publication Data
US 2013/0339905 A1 Dec. 19, 2013

Related U.S. Application Data

(63) Continuation of application No. 13/364,996, filed on Feb. 2, 2012, now Pat. No. 8,527,904.

(60) Provisional application No. 61/541,319, filed on Sep. 30, 2011.

(51) Int. Cl.
*G06F 7/00* (2006.01)
*G06F 17/30* (2006.01)
*G06F 3/0488* (2013.01)

(52) U.S. Cl.
CPC .......... *G06F 17/30312* (2013.01); *G06F 7/00* (2013.01); *G06F 3/0488* (2013.01)
USPC .......... 707/797; 715/821; 715/810; 715/863; 715/835

(58) Field of Classification Search
CPC .......... G06F 3/04883; G06F 3/04886; G06F 3/0485; G06F 3/0488; H04M 1/72583; H04M 2250/22
USPC .......................................... 707/797
See application file for complete search history.

(56) References Cited

U.S. PATENT DOCUMENTS 6,539,394 B1 3/2003 Calvignac et al.
7,089,494 B1 8/2006 Burrell (Continued)

FOREIGN PATENT DOCUMENTS

WO 2013/049310 4/2013

OTHER PUBLICATIONS

Gagie, et al., "Range Quantile Queries: Another Virtue of Wavelet Trees," Retrieved from http://arxiv.org/PS_cache/arxiv/pdf/0903/0903.4726v6.pdf, Apr. 7, 2010, 7 pages.

(Continued)

*Primary Examiner* — Binh V Ho
(74) *Attorney, Agent, or Firm* — Kilpatrick Townsend & Stockton LLP

(57) ABSTRACT

Systems and method for interpreting a data selection on a touch screen may include providing an interface on the touch screen with a plurality of lanes, each lane associated with an attribute, and each attribute associated with a plurality of values. Icons may fill each lane, with each icon configured to display one of the values of the attribute of the lane. The interface may also have a first lane where a first icon is not displayed. It may be determined that a finger gesture input from the touch screen with a direction is associated with the first lane, and in response, the icons in the first lane may be moved in that direction to display the first icon. A finger tap input from the touch screen corresponding to the first icon may enlarge a size of the first icon on the touch screen to substantially fill the first lane.

20 Claims, 12 Drawing Sheets

(56) References Cited

U.S. PATENT DOCUMENTS

| | | | |
|---|---|---|---|
| 7,479,949 B2* | 1/2009 | Jobs et al. | 345/173 |
| 7,716,250 B1 | 5/2010 | Manasse et al. | |
| 7,808,929 B2 | 10/2010 | Wong et al. | |
| 7,895,216 B2 | 2/2011 | Longshaw et al. | |
| 7,937,326 B1* | 5/2011 | Thaxton | 705/57 |
| 7,937,726 B2 | 5/2011 | Nashida et al. | |
| 8,171,539 B2 | 5/2012 | Miranda | |
| 8,527,904 B2 | 9/2013 | Liu et al. | |
| 2005/0050060 A1 | 3/2005 | Damm et al. | |
| 2008/0174570 A1* | 7/2008 | Jobs et al. | 345/173 |
| 2009/0037844 A1* | 2/2009 | Kim et al. | 715/815 |
| 2009/0064055 A1* | 3/2009 | Chaudhri et al. | 715/863 |
| 2010/0064252 A1* | 3/2010 | Kramer et al. | 715/810 |
| 2010/0100463 A1* | 4/2010 | Molotsi et al. | 705/32 |
| 2010/0146440 A1* | 6/2010 | Seong et al. | 715/810 |
| 2010/0177640 A1* | 7/2010 | Booman et al. | 370/242 |
| 2011/0072394 A1* | 3/2011 | Victor | 715/821 |
| 2011/0078104 A1 | 3/2011 | Honkola et al. | |
| 2012/0215578 A1* | 8/2012 | Swierz et al. | 705/7.14 |

OTHER PUBLICATIONS

Mount, et al., "A Dynamic Data Structure for Approximate Range Searching," SCG '10, Jun. 13-16, 2010, Snowbird, Utah, USA. Retrieved from https://www.cs.umd.edu/~mount/Papers?socg10-quadtreap.pdf, 2010, 10 pages.

U.S. Appl. No. 13/342,725, filed Jan. 3, 2012, Non-Final Office Action mailed Jan. 31, 2013, 25 pages.

U.S. Appl. No. 13/342,725, filed Jan. 3, 2012, Notice of Allowance mailed Apr. 22, 2013, 11 pages.

International Search Report and Written Opinion received in International application No. PCT/US2012/057502, Dec. 11, 2012, 17 pages.

U.S. Appl. No. 13/364,996, Non-Final Office Action mailed on Dec. 28, 2012, 29 pages.

U.S. Appl. No. 13/364,996, Notice of Allowance mailed on May 8, 2013, 13 pages.

* cited by examiner

QUICK DATA ENTRY LANES FOR TOUCH SCREEN MOBILE DEVICES

CROSS REFERENCES

This application is a continuation of U.S. patent application Ser. No. 13/364,996 filed Feb. 2, 2012, titled "QUICK DATA ENTRY LANES FOR TOUCH SCREEN MOBILE DEVICES," which claims priority from U.S. Provisional Patent Application No. 61/541,319, filed Sep. 30, 2011, entitled "QUICK DATA ENTRY LANES FOR TOUCH SCREEN MOBILE DEVICES," both of which are hereby incorporated by reference, as if set forth in full in this document, for all purposes.

BACKGROUND

With the rapid improvements being made in the art of mobile computing devices, work spaces that once resided primarily on desktop workstations may increasingly be ported to smart phones and Personal Data Assistants (PDAs). These mobile devices may be particularly useful for tracking and recording data inputs in real time as they become available to a user. Instead of waiting for access to a stationary computer, a user may immediately enter data on his/her mobile device as the data becomes available. However, increased portability may also come with numerous tradeoffs. For example, most mobile devices have a limited screen size which may limit the amount of information that may be displayed to a user simultaneously on the screen. Input devices and methods may similarly be limited and require extensive scrolling operations that drill down through layers of options in order to select a single input option.

Presently, data are presented in a traditional input form as illustrated in FIG. 3A. Users are required to drill down to a separate page or to use additional components to select and enter values. The most frequently used input method is the rolling time wheel, which is usually a calendar component. In some other cases, users are required to manually type the value with a soft keyboard. However, even if a wheel or keyboard component is provided, the data values are hidden until the components are evoked as shown in FIG. 3B. Even after the components are evoked, the available values are not readily apparent in the page and may require extensive scrolling, which results in confusion and a slow data entry process. Hence, improvements in the art are needed.

BRIEF SUMMARY

An embodiment is disclosed herein of a method for interpreting a data selection according to an input received on a touch screen. The method may comprise providing an interface on the touch screen. The interface on the touch screen may comprise a plurality of lanes, where each lane is associated with an attribute, and where each attribute is associated with a plurality of values. Furthermore, the interface may comprise a plurality of icons in each lane, where each icon is configured to display one of the plurality of values of the attribute associated with each lane, and where at least a portion of the plurality of icons in each lane is displayed on the touch screen. The interface may also comprise a first lane in the plurality of lanes wherein a first icon is not displayed. The method may also comprise determining that a finger gesture input from the touch screen has a direction and is associated with the first lane in the plurality of lanes, and in response to the finger gesture input, moving the plurality of icons in the first lane in the direction of the finger gesture input such that the first icon is displayed on the touch screen. The method may additionally include determining that a finger tap input from the touch screen corresponds to the first icon, and in response to the finger tap input, enlarging a size of the first icon on the touch screen to substantially fill the first lane.

In another embodiment, a system for storing a data selection is discussed. The system may include a touch screen, one or more processors, and a memory operatively coupled to the one or more processors, where the memory has sets of instructions stored on it which, when executed by the one or more processors, cause the one or more processors to provide an interface on the touch screen. The interface may include a plurality of lanes, where each lane is associated with an attribute, and where each attribute is associated with a plurality of values. The interface may also include a plurality of icons in each lane, where each icon is configured to display one of the plurality of values of the attribute associated with each lane and where at least a portion of the plurality of icons in each lane is displayed on the touch screen. The instructions may further cause the processor to receive a plurality of finger tap inputs from the touch screen, wherein each finger tap input corresponds to one of the icons in each lane, and in response to each finger tap input, enlarge a size of the corresponding icon within each lane. The instructions may additionally cause the processor to receive a subsequent finger tap input indicating that the data selection is complete, and in response to the subsequent finger tap input, store, in the memory, the values that each icon corresponding to the finger tap inputs is configured to display.

In yet another embodiment, a computer-readable medium for storing a data selection is discussed. The computer-readable medium may have sets of instructions stored on it which, when executed by a computer, cause the computer to provide an interface on a touch screen. The interface may include a plurality of lanes arranged in horizontal rows, where each row extends from a first vertical edge of the touch screen to an opposite vertical edge of the touch screen, where each lane is associated with an attribute having a name, and where each attribute is associated with a plurality of values. The interface may also include a title display in each lane configured to display a graphical representation of the name of the attribute associated with each lane, and a plurality of icons arranged linearly within each lane, where each icon is configured to graphically represent one of the plurality of values of each attribute associated with each lane. The instructions may further cause the processor to receive a selection of an icon for each lane;, and enlarge the selected icon for each lane to substantially fill each lane.

BRIEF DESCRIPTION OF THE DRAWINGS

FIG. 8 illustrates an interface for storing data selections, according to one embodiment.

FIG. 10 illustrates an example of a data entry application according to one embodiment.

DETAILED DESCRIPTION OF THE INVENTION

Figure 1:
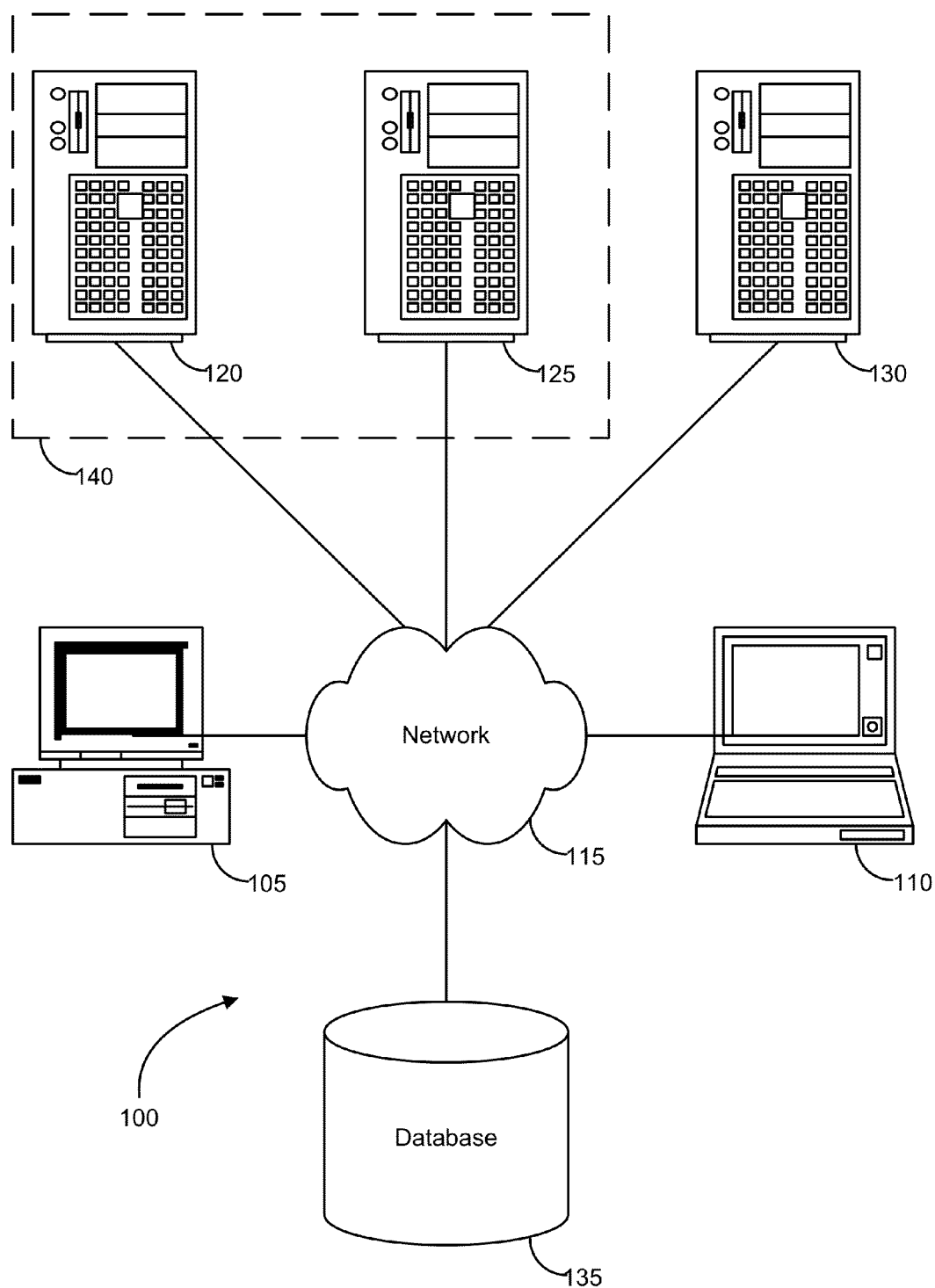
FIG. 1 shows a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

FIG. 1 is a block diagram illustrating components of an exemplary operating environment in which various embodiments of the present invention may be implemented. The system 100 can include one or more user computers 105, 110, which may be used to operate a client, or a dedicated application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g that is adapted to store, update, and retrieve data in response to SQL-formatted commands.

Figure 2:
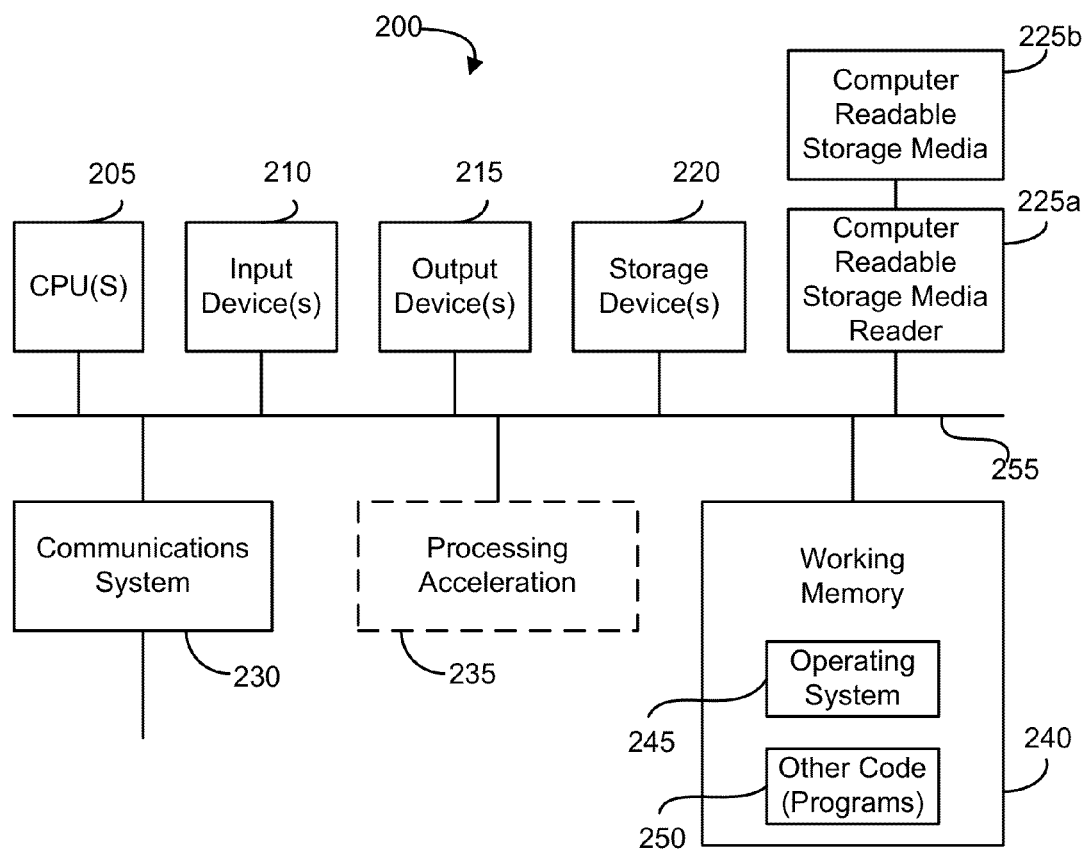
FIG. 2 shows a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include a storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Aspects of the present invention present a new way of data entry and data selection for touch screen devices. The method includes multiple lanes, where each lane holds an attribute with multiple options, or values, that a user may select from. At least two finger inputs on the touch screen may be used to make each selection: a finger gesture, such as a swipe, and a finger tap. By swiping in the direction of the lane, the user is allowed to see the options available in the lane. Then, the user taps on the particular icon within a lane to make the selection. The selected icon may then expand the entire width of the screen and/or be highlighted. A user can quickly recover from an incorrect selection by simply finger-tapping the expanded selection. A second finger-tap interaction may reduce the current selection and again show at least some of the available options in the lane.

Additionally, with work spaces moving from desktops to mobile devices as the major trend, adding freedom and flexibility to work has become vital. Products need to adapt to this change to be competitive, particularly in the enterprise management software field. The data selection and data entry embodiment discussed herein may greatly reduce the time for employees to enter time and other types of data through a time entry system on their mobile devices or PCs. The simplicity and convenience of this method may encourage users to utilize mobile devices more frequently to enter data while they are away from their desks, and possibly raise the customer satisfaction with the designed applications.

Figures 3A, 3B:
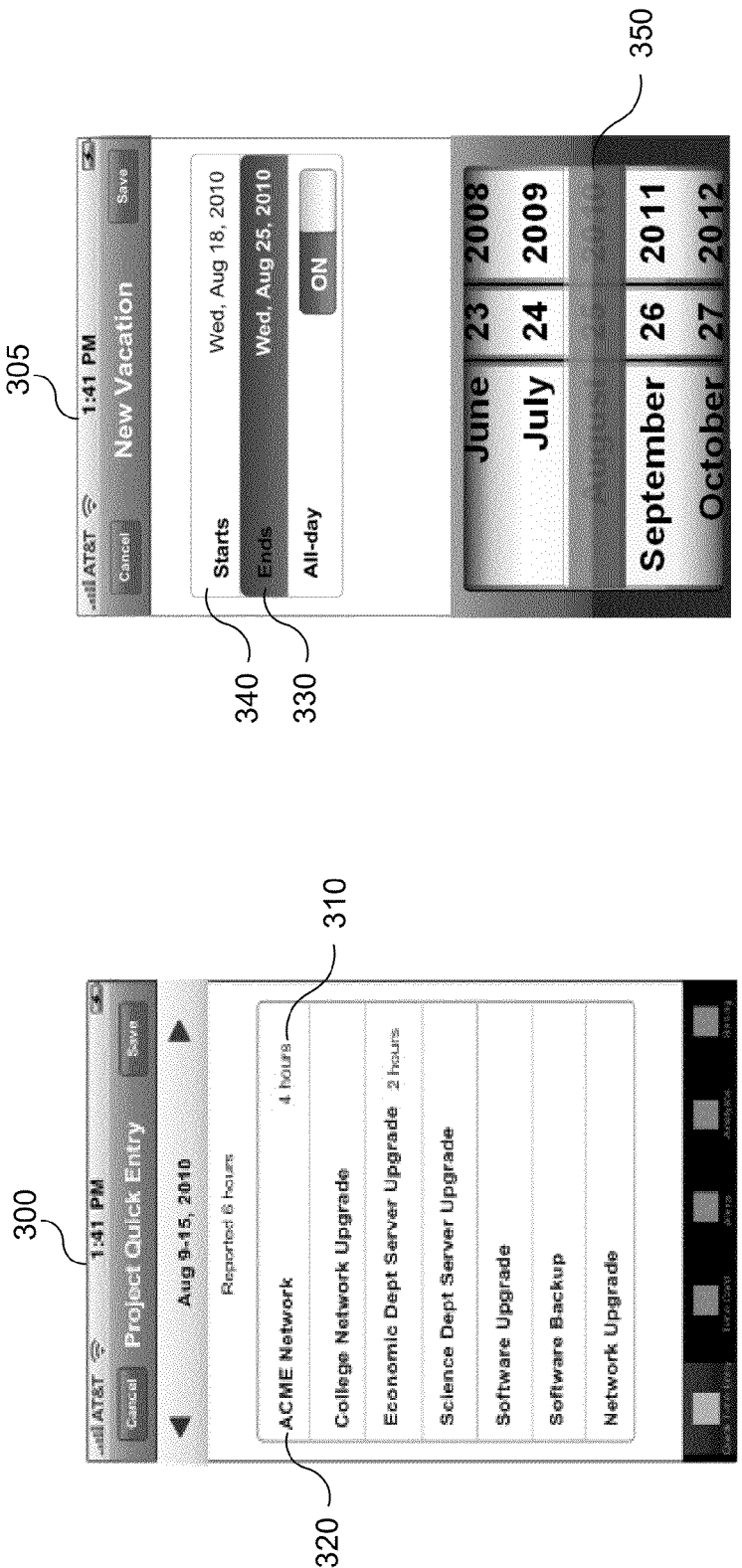
FIGS. 3A-3B illustrate existing touch screen data entry methods and interfaces.

In contrast, existing methods for data entry comprising multiple attributes requires a cumbersome procedure. For example, a traditional interface 300 for a touch-screen device is illustrated in FIG. 3A. The interface displays multiple data attributes on the same page, but in order to input a value for these attributes, the user was required to drill down to a separate page or to use additional components to select and enter values. For example, to enter time spent on the "ACME Network" project 320, the user would have to tap that attribute icon and go to a different page to enter the value 310 of "4 hours". One frequently used input method is the rolling time wheel 350 illustrated in FIG. 3B, which is usually a calendar component. Even though using the rolling time wheel 350 occasionally allows the input method to appear on the same page as the attribute 330, it disappears when then input for that attribute 330 is complete, and the possible values for other attributes such as the start time attribute are not available at the same time (i.e., separate rolling time wheels are not simultaneously displayed for both the start and end time). In some other cases, users are required to manually type the value with a soft keyboard. However, even if a wheel or keyboard component is provided, the data values are hidden until the value input components are evoked. Even after the value input components are evoked, the available values are not readily apparent in the page and may require extensive scrolling, which results in confusion and a slow data entry process. Hence, improvements in the art are needed.

The present invention provides methods and systems for selecting and entering data that is faster than existing methods and systems. The present invention requires fewer inputs, and all the user needs to do is "swipe to see" and "tap to choose". It also supports multiple entries on the same display view without requiring navigation through numerous levels of an input hierarchy spanning multiple display views. After receiving a save input, the user may also stay on the same page and continuing enter other data. Additionally, a user may add a value that is not available in the initial default set. Also, new lanes may be added to the display dynamically in response to selection inputs received from a user.

Furthermore, the present invention provides for a shorter learning curve. Multiple usability experiments have been conducted to validate this design, and it has been confirmed that the "swipe to see" and "tap to choose" model is intuitive and easy to learn compared to existing methods. The flat information architecture is rich with information compared to the prior data entry methods. A flat information architecture provides all of the necessary information on the same page. It saves multiple drill downs and leads to less confusion.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

Figure 4:
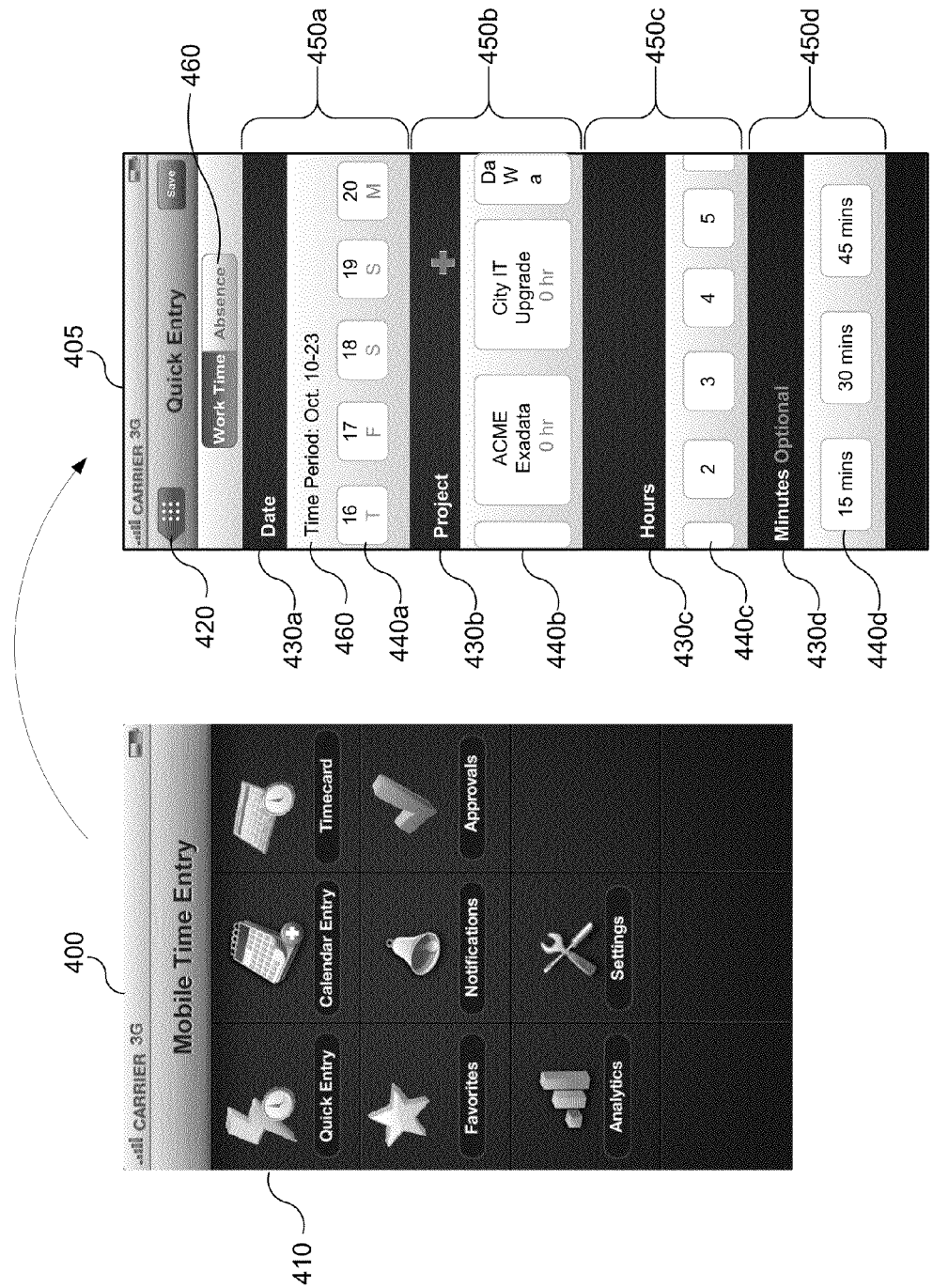
FIG. 4 illustrates an interface for quick-data entry according to one embodiment.

FIG. 4 illustrates an interface 400 for quick-data entry according to one embodiment. This particular interface may be used in connection with a mobile time entry application. In one embodiment, this interface may be used in connection with a time entry application in a project management software suite wherein users may record time to specific projects and/or tasks for billing purposes or otherwise. In another embodiment, this interface may be used in connection with a human resources application for tracking work and vacation time for employees. Other embodiments may include various other uses for this type of interface, such as task management, account management, transaction approval and management, personal data entry, calendar management, fitness management, and/or any other use that may benefit from a fast and convenient data entry interface.

The first interface 400 may be used as a springboard, or main menu from which a quick-entry interface may be launched. In this embodiment, a button 410 may be used to receive an input from a user requesting access to a particular quick-entry interface screen. After button 410 receives the requisite input, the interface 400 may transition to the quick-entry interface 405. The quick-entry interface 405 may or may not take the entire screen to display. In some embodiments, the interface may lay on top of other interfaces on the device, such as interface 400. In other embodiments, the quick-entry interface 405 may occupy the entire display area.

An exit button 420 may be provided on the quick-entry interface 405, and may be configured to receive an input to close the quick-entry interface 405 and return to the interface that called the quick-entry interface 405, such as interface 400. Upon receiving such an input, the exit button 420 may save the data entry on the quick-entry interface 405 regardless of whether the data entry was complete. In cases where the data entry was incomplete, i.e. values were not chosen for each attribute, the quick-entry interface 405 may save the state of the data entry. When the button 420 receives an input directing the device to once again open the quick-entry interface 405, it may also reproduce the state of the data entry where the user last left off. Thus, any values that were chosen for attributes during a prior session may be recreated such that the user does not need to reproduce any prior inputs. If values for each attribute are selected prior to an input received by the exit button 420, one embodiment may be configured to save the state of the inputs. Alternatively, another embodiment may be configured to save all of the inputs as a completed transaction and store the results to a memory such that the quick-entry interface 405 will be reset the next time it is displayed.

One embodiment of the quick-entry interface 405 may contain a top-level entry toggle 460 that may switch between various modes of data entry. For example, the entry toggle 460 includes two settings, namely "Work Time" and "Absence". Each of these two settings may be used to populate the data entry lanes that are displayed below the entry toggle 460. The "Work Time" setting may include attributes and values that correspond to entering time spent on a project, whereas the "Absence" setting may cause attribute and values to be displayed that relate to recording sick time, vacation time, and/or the like. The settings displayed in the selection toggle 460 of FIG. 4 are merely illustrative, and many other types of settings may be used depending on the type of application. For example, a fitness tracking application may use settings such as "Weight Training" and "Cardio". An account management may include settings for "Reconcile", "Expense", "Deposit", and "Budget". It will be clear in light of this disclosure that various applications for which embodiments may be used may require different categories for the selection toggle 460.

Below the selection toggle 460 in FIG. 4, there are a series of data lanes 450. Each data lane 450 may be associated with a number of data elements. In one embodiment, each data lane 450 may be associated with at least one attribute. An attribute could be, for example, a date on which work was accomplished, a project name and/or number, an amount of time spent on the project, and/or the like. Some embodiments consider attributes to be categories of information for which an input may be required from a user. In some cases, an attribute may be formulated as a question for which the user may need to provide an answer.

Each attribute, and therefore each data lane may be associated with one or more values. A value may be considered to be a specific instance of the attribute type. A value may also be considered to be an answer to a question represented by an attribute. For example, a project name and/or number may be an attribute, and a listing of possible projects that may be assigned to a particular user may be a list of values. By associating attributes with data lanes in the quick-entry interface 405, the attributes may be presented to a user, and the user may subsequently select a value corresponding to each attribute.

In FIG. 4, each attribute corresponds to a data lane 450. A data lane may be a graphical representation of a particular attribute and the possible values associated with the attribute. A data lane 450 may broadly be a grouping of values that are arranged around an attribute in a way that allows a user to select one of the possible attributes. Merely as an example, the data lanes 450 in FIG. 4 arranged as vertical rows, one on top of the other. In another embodiment (not shown) the data lanes 450 are arranged as vertical rows, one next to the other. In other embodiments, the data lanes 450 are arranged as individual windows within the quick-entry interface 405. Other data lane configurations may be implemented by various embodiments in ways that are not shown, yet are consistent with the functionality described herein.

Not only may the shape of the data lanes 450 be changed from the horizontal configuration shown in FIG. 4, but the linear nature of the data lanes 450 may also be changed. In one embodiment, the data lanes may be arranged as circular wheels that a user may rotate to choose a value. In another embodiment, the data lanes 450 may be similar to the linear arrangement shown in FIG. 4, except that the lanes may be arcs that follow a curved trajectory. This radius of the arc may be configured to be consistent with the radius of the arc made by a finger swiping back and forth while the hand of the user stays stationary.

Each data lane may be comprised of a number of graphical components. In the embodiment illustrated in FIG. 4, the each data lane 450 may be divided into two portions. A title portion 430 may be a banner-style display that provides a graphical representation of a name associated with the attribute for that data lane. For example, data lane 450*a* includes a title portion 430*a* configured to display a banner of the attribute named "Date" that is associated with the data lane 450. Similarly, data lane 450*b* includes a title portion 430*b* configured to display a banner of the attribute named "Project"; data lane 450*c* includes a title portion 430*c* configured to display a banner of the attribute named "Hours"; and data lane 450*d* includes a title portion 430*d* configured to display a banner of the attribute named "Minutes" that is associated with the data lane 450. The title portions 430 displayed here are merely illustrative, and it will be understood that many different graphical representations are contemplated by various embodiments. Also, the arrangement of the title portion may vary between embodiments. For example, in one embodiment the title portion comprises a watermark behind the value icons. In another embodiment, the title portion comprises a vertical banner on the side of a horizontal data lane. In yet another embodiment, the title portion maybe positioned along the bottom of the data lane. Other embodiments may eliminate the title portion altogether, particularly when the nature of the values makes clear the nature of the associated attribute.

In addition to the title portion 430, each data lane 450 may also include one or more icons 440 that are configured to graphically represent at least some of the values that are associated with each attribute. The icons 440 may be as simple as a text box displaying the name of the value, or as complex as a graphical animation. In the quick-entry interface 405 shown in FIG. 4, many of the icons 440 are represented by rectangular icons containing a short textual description of the value. For example, data lane 450*a* contains icons 440*a* that display both a date and a day of the week to represent date values. Similarly, data lane 450*b* contains icons 440*b* that display both a project name and an amount of hours worked to represent project values; data lane 450*c* contains icons 440*c* that display a single number to represent hour values; and data lane 450*d* contains icons 440*d* that display a number with a "minutes" unit to represent minute values. Note that the icons are not limited to displaying only information describing the associated values. Instead, some embodiments may also use them to display information that would be relevant to a user choosing among the various icons. For example, icons 440*b* representing the project values are not limited to describing the project name, but may be extended to also display the amount of time that the particular user has billed to that project. This may help a user determine where time should be billed if projects have limited funding or the user makes an effort to distribute costs among various projects.

In addition to the title portion 430 and the icons 440, each data lane 450 may include additional information 460 to help the user understand the attribute and choose between the various values. Such additional information 460 may be included in every data lane 450, or it may be included in a subset of the data lanes, or it may be excluded completely, depending on the types of information and the number of data lanes. For example, data lane 450*a* includes additional information 460 that describes the relevant time period from which the date values are provided. This additional information 460 is displayed in the portion of the data lane 450 that displays the icons 440. However, additional information may also be displayed in various other locations. Track 450*d* includes additional information displaying the word "Optional" in the title portion 430*d* of the data lane 450*d*. Generally, additional information that describes the attribute as a whole could be included in the title portion 430*d*, whereas additional information 460 that describes the selection of among the icons 440*a* may be displays with the icons 440*a*.

The amount of information displayed in the icons 440 may be adjusted based on the size of the display, the number of data lanes 450, the amount of information in the title portions 430, and/or various other hardware and software factors. The amount of information displayed in the icons 440 may determine the number of icons that may be displayed together in the data lane at one time. For example, the icons 440*c* in data lane 450*c* only contain a single number representing the hours spent on a project; therefore, nearly five icons may be displayed in the data lane 450*c*. In contrast, the icons 440*b* in data lane 450*b* contain two lines of project name information and a third line describing the amount of time previously billed to the project. Because more information may be displayed, bigger icons may be used, and less than three icons may be displayed together in the data lane 450*b*. If the resolution of the screen on which the quick-entry interface 405 is displayed changes, or the quick-entry interface 405 is displayed on a screen with a different size, then more or less icons 440 may fit in each data lane 450. Additionally or alternatively, when the resolution or size of the screen changes, the icons may display more or less information. For example, if the resolution of the screen in FIG. 4 were to increase, the project icons 440*b* may be able to add a line that describes the total hour budget of each project, or may add a unique graphic to help the user quickly distinguish between each project icon 440b. The amount of the information represented by each icon may be influenced dynamically by user settings, software settings, and/or various hardware or software characteristics.

Depending on the number of icons, the size of the icons, and the amount of information displayed by each of the icons, a subset of the icons may be displayed in each data lane. For example, the "Date" data lane 450a includes icons 440a representing fourteen different values (fourteen days during the time period of October 10-October 23). Based on the size of the display, the length of data lane 450a, and the size of the date icons 440a, only five of the fourteen date icons 440a are displayed together on the display. In one embodiment, when the icons are scrolled left and right, the data lanes 450 move non-continuously by defined amounts. In other words, when an input above a threshold horizontal magnitude is received, the row of icons 440a may shift one icon off the display and shift another icon on the display. Thus, shifting icons could occur in increments of one or more icons. In another embodiment, receiving a command to shift the icons to the left or right may shift the entire group by the number of icons 440a in the data lane 450a. For example, if a user provided a finger gesture to the right inside of data lane 450a, the display may immediately display icons representing the date values of Saturday the 11$^{th}$ to Wednesday the 15$^{th}$. In these embodiments, only whole icons may be displayed as in data lane 450a.

In another embodiment, the icons 440 may be scrolled continuously across the data lanes 450. In this embodiment, a finger gesture with a directional component towards one of the sides of the data lane 450 may scroll the icons across the display in a continuous animation. Scrolling finger gestures may result in the partial display of icons, where part of the icon is cut off by the edge of the display. For example, data lane 450b includes two complete icons and two icons that are cut off by the edge of the display. This type of interface may also utilize finger gestures such as a "fling" that provide for an inertia-like response from the data line. For example, a "fling" to the left may rapidly animate the icons 440b in data lane 450b all the way to the right-most icon.

Figure 5:
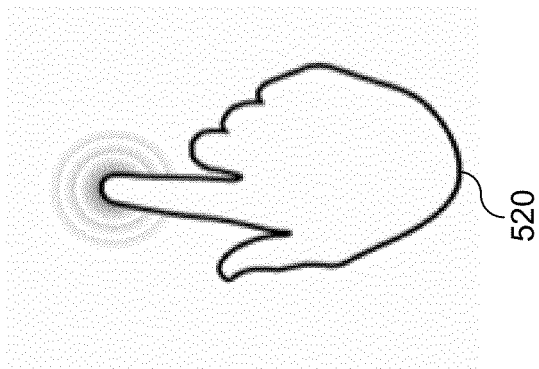
FIG. 5 illustrates at least two types of finger inputs that can be received by a touch-screen device.
Figure 5:
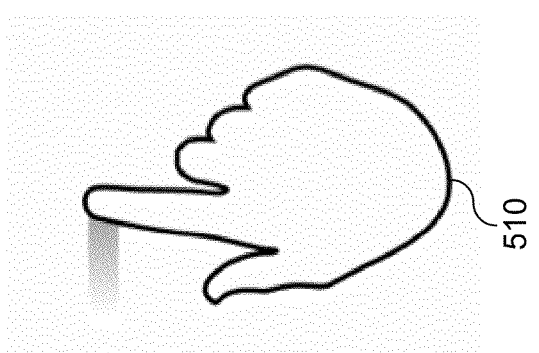

FIG. 5 illustrates at least two types of finger inputs that can be received by a touch-screen device. Generally, there are a number of different types of finger gestures that may be used to scroll through and select from the icons 440. Two of the most common are the scroll (or drag) and the swipe (or fling). These finger gestures are illustrated by gesture 520 in FIG. 5. A scroll/drag gesture occurs when a user places a finger in a first location on the touch-screen and drags it to a second location while maintaining contact with the touch-screen before, during, and after the drag. The measurements that are of consequence during a scroll/drag are the starting and ending locations. From these, the icons 440 may be moved a proportional distance within the data lanes 450. In contrast, a swipe/fling gesture corresponds to a user dragging a finger across the touch-screen at or above a certain velocity and then lifting the finger from the touch-screen at the end of the gesture. The measurements of interest in a swipe/fling are the starting and ending locations and the velocity of the gesture. From these, the display can be "flung" on the touch-screen farther than the proportional distance between the starting and ending points of the gesture. Various embodiments may use these two types of finger gestures interchangeably to scroll through icons 440 within each data lane 450.

It is important to note that various embodiments of this invention may use many different types of finger gestures.

Some embodiments may also use various different methods of deriving a directional component from a finger gesture and correlating the derived direction with a direction to scroll the icons 440. It will be understood in light of this disclosure that these examples are not limiting, but are instead only one way of implementing this invention. Therefore, the details provided below are described only to provide an enabling disclosure, and are thus only illustrative. Consequently, the left and right swipes described below could be replaced by other directions and gestures, or could be otherwise replaced by using a stylus, touchpad, mouse, and/or any other input device suitable for providing a directional input.

In addition to a finger gesture 510, some embodiments may also utilize a finger tap input 520. A finger tap 520 may be characterized by a user placing a finger on the touch screen and then removing the finger without significant movement while in contact with the touch screen. A finger tap 520 may be used to select an icon from the plurality of icons 440 displayed in a particular data lane 450. Consequently, between the finger gestures 510 and finger taps 520, a user may be able to navigate through the icons 440 available within each data lane 450, select an icon for each data lane 450, and thus select a value for each attribute represented by the quick-entry interface 405.

Figure 6:
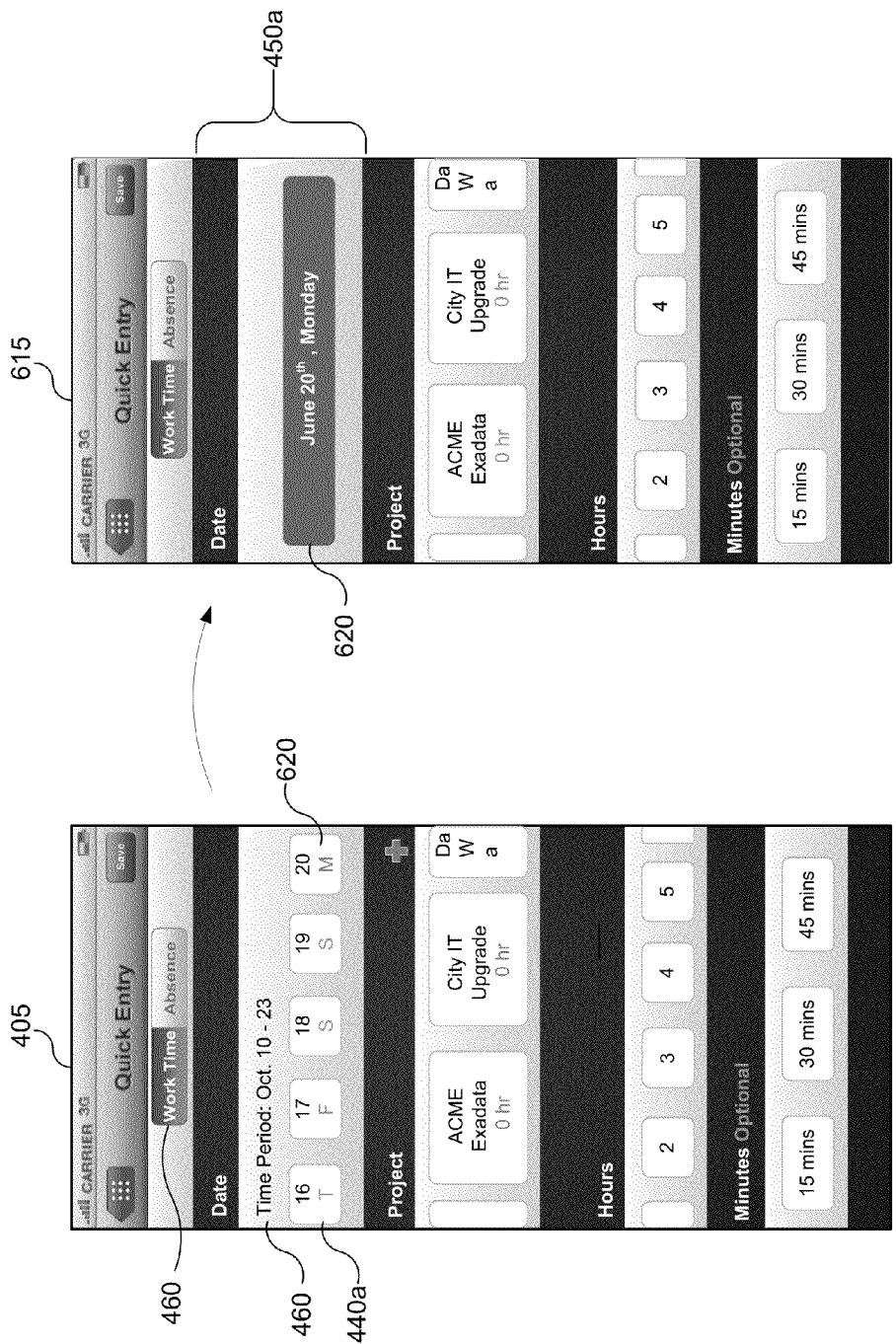
FIG. 6 illustrates an interface for selecting an icon from within a data lane, according to one embodiment.

FIG. 6 illustrates an interface for selecting an icon from within a data lane, according to one embodiment. Interface 405 is in the "Work Time" data entry mode according to the selection button 460. In this configuration, the interface 405 may receive an input for a date on which hours for a particular project were worked. A finger gesture input may be received that causes the icons 440a in the "Date" data lane 450a back and forth in the horizontal direction. This may reveal any icons that are not displayed on the interface 405, such as the icons representing the dates of Wednesday the 15$^{th}$, or Tuesday the 21$^{st}$. When the desired icon is displayed in the data lane 450a, the interface 405 may receive a finger tap input selecting a particular icon, such as icon 620 representing the data of Monday the 20$^{th}$.

After selecting the icon 620, the graphical representation of the icon may change to indicate that the selection has been made. In one embodiment shown in FIG. 6, the size icon 620 may be adjusted to indicate the selection. For example, the icon 620 may be enlarged to substantially fill the data lane 450a. Interface 615 shows an example of icon 620 substantially filling the data lane. One having skill in the art would readily recognize this as enlarging the width and height of the icon 620 such that the majority of the data lane 450a was filled, while leaving a comparatively small border around the icon 620. Depending on the size of the data lane 450a, the icon 620 may be enlarged to occupy 40%-90% of the graphical area of the data lane 450a. In one embodiment, the icon 620 is enlarged to occupy more than 50% of the data lane 450a. In another embodiment, the icon 620 is enlarged to occupy more than 60% of the graphical area of the data lane 450a. In yet another embodiment, the icon 620 is enlarged to occupy more than 75% of the graphical area of the data lane 450a. In yet another embodiment, the icon 620 is enlarged to occupy more than 80% of the graphical area of the data lane 450a.

In one embodiment, the icon 620 may be enlarged as a continuous animation. For example, the small version of the icon 620 in interface 405 could be gradually increased in to substantially fill the data lane 450a as shown in interface 615. Alternatively, the size of the icon 620 could make an immediate transition between the two sizes without an animation. Additionally, the icon may be highlighted in other ways such as a changed border, and changed color, changed font, and/or the like. For example, the icon 620 in interface 615 has the background color changed from white to blue to highlight the selection.

After icon 620 is selected and enlarged or otherwise graphically differentiated from the rest of the icons 440a, the interface 615 may perform other actions. In one embodiment, selection icon 620 disables the scrolling action of the icons 440a in response to finger gestures. Another embodiment removes all of the icons 440a from the data lane 450a display except for the selected icon 620. Depending on the enlarged size of the selected icon 620, the remaining icons 440a may be partially obscured by the selected icon 620.

In order to recover from an erroneous finger tap selecting icon 620, the interface 615 may receive a second finger tap from the touch screen inside the graphical area of either the selected icon 620 or the data lane 450a. This second tap may be interpreted as a means to de-select icon 620 and again display the full set of icons 440a from which to choose. Upon receiving a de-selection command, the icon 620 may return to its previous size using a continuous animation, or in another embodiment it may immediately return to its original size. After the de-selection, the interface 405 may again receive finger gesture inputs and finger tap inputs to select another icon. A de-selection finger tap may come at any point in the data entry process. Using the continuous animations as described herein provides visual cues that make the data entry process intuitive and easy to follow from one selection to the next.

Figure 7:
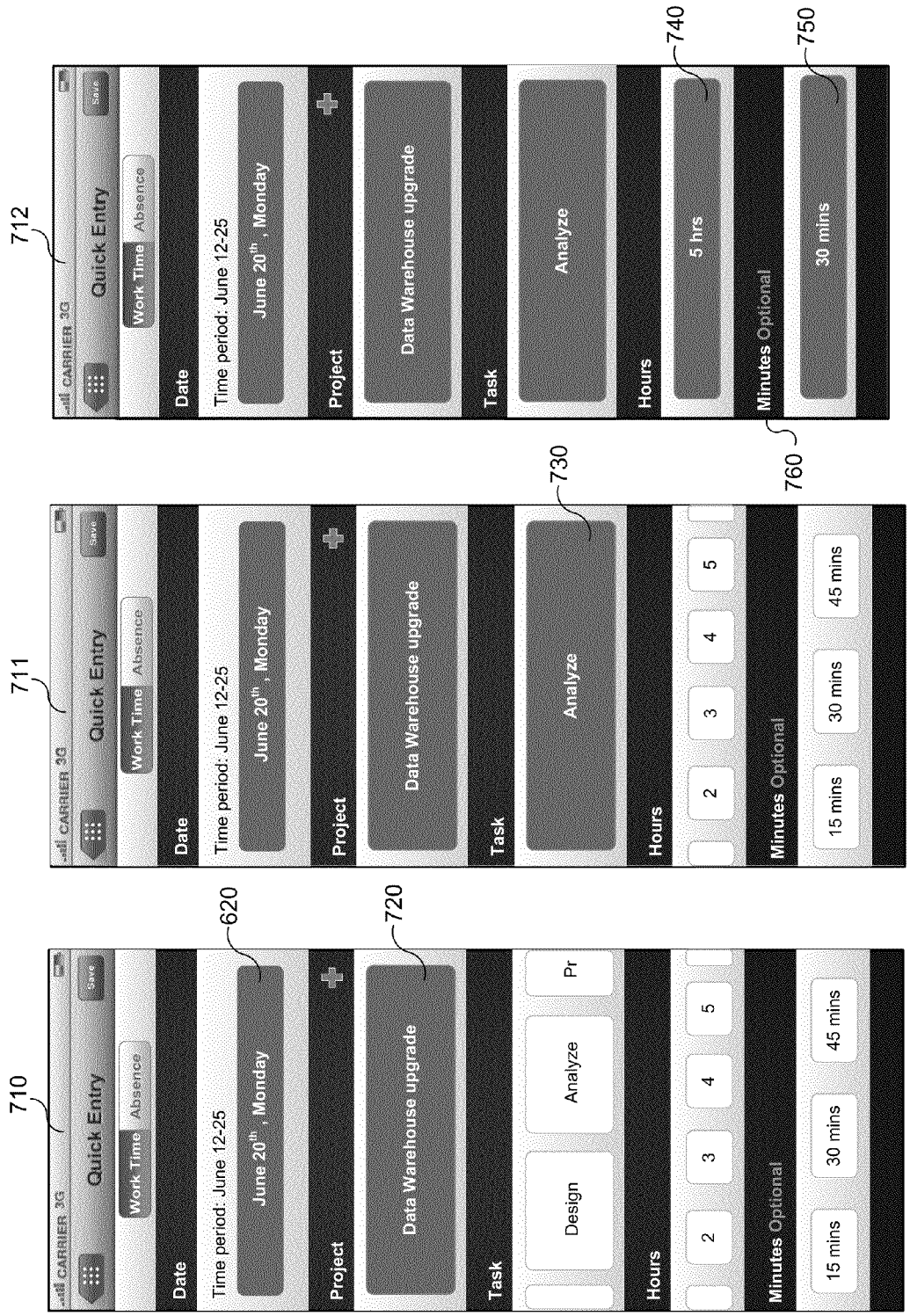
FIG. 7 illustrates selecting a value for each data lane in the interface.

FIG. 7 illustrates selecting a value for each data lane in the interface 710. Interface 710 shows the icon 620 is still selected from interface 615 from FIG. 6. Generally, once selected, an icon may retain its highlighted/enlarged form as the user moves on to the remaining data lanes. After selecting icon 620, the interface 710 may receive a finger tap input selecting icon 720 from the "Project" data lane. Next, the interface 711 may receive a finger tap input selecting icon 730 from the "Task" data lane. Finally, the interface 712 may receive a finger tap input selecting icon 740 from the "Hours" data lane and icon 750 from the "Minutes" data lane.

Selection of the various icons shown in FIG. 7 is sequential, from top to bottom. In other words, the data lanes may be arranged in a hierarchy such that icons should be selected from data lanes that are higher before icons are selected from data lanes that are lower in the hierarchy. In this embodiment, a user may be prevented from selecting icon 730 from the "Task" data lane unless icon 720 from the "Project" data lanes and icon 620 from the "Date" data lanes have already been selected. However, in another embodiment, this restriction may be removed, depending upon the nature of the data entry application. For example, one embodiment allows a user to select any icon in any order. Also various combinations may be utilized, such that some icons may be selected at any time, while others may require prior icons in a hierarchy to be selected first.

Further, some embodiments may be context-based. Based on the data selected in the previous lanes, additional lanes may be inserted below in the same interface. For example, the various projects may have different activities associated with them. Once icon 720 is selected from the "Project" data lane in interface 710, the "Task" data lane may be populated with additional values that are specific to the particular type of project selected. If the user were to de-select the icon 720, then any icons added to the "Task" data lane could be removed. When values in one data lane depend upon selections made in another data lane, then the user may be required to make a selection in the other data lane first, as discussed above. Alternatively or additionally, entire data lanes may be added or removed in response to selections made in already-displayed data lanes. Merely by way of example, a certain project may require an additional code for certain activities performed on the project. Once this particular project is selected, an additional data lane may be added that displays icons representing the project codes. Therefore, data lanes may be displayed in context to meet user's needs. The interface may provide only the necessary information at each input stage in order to simplify the interface and avoid user confusion.

Figure 8:
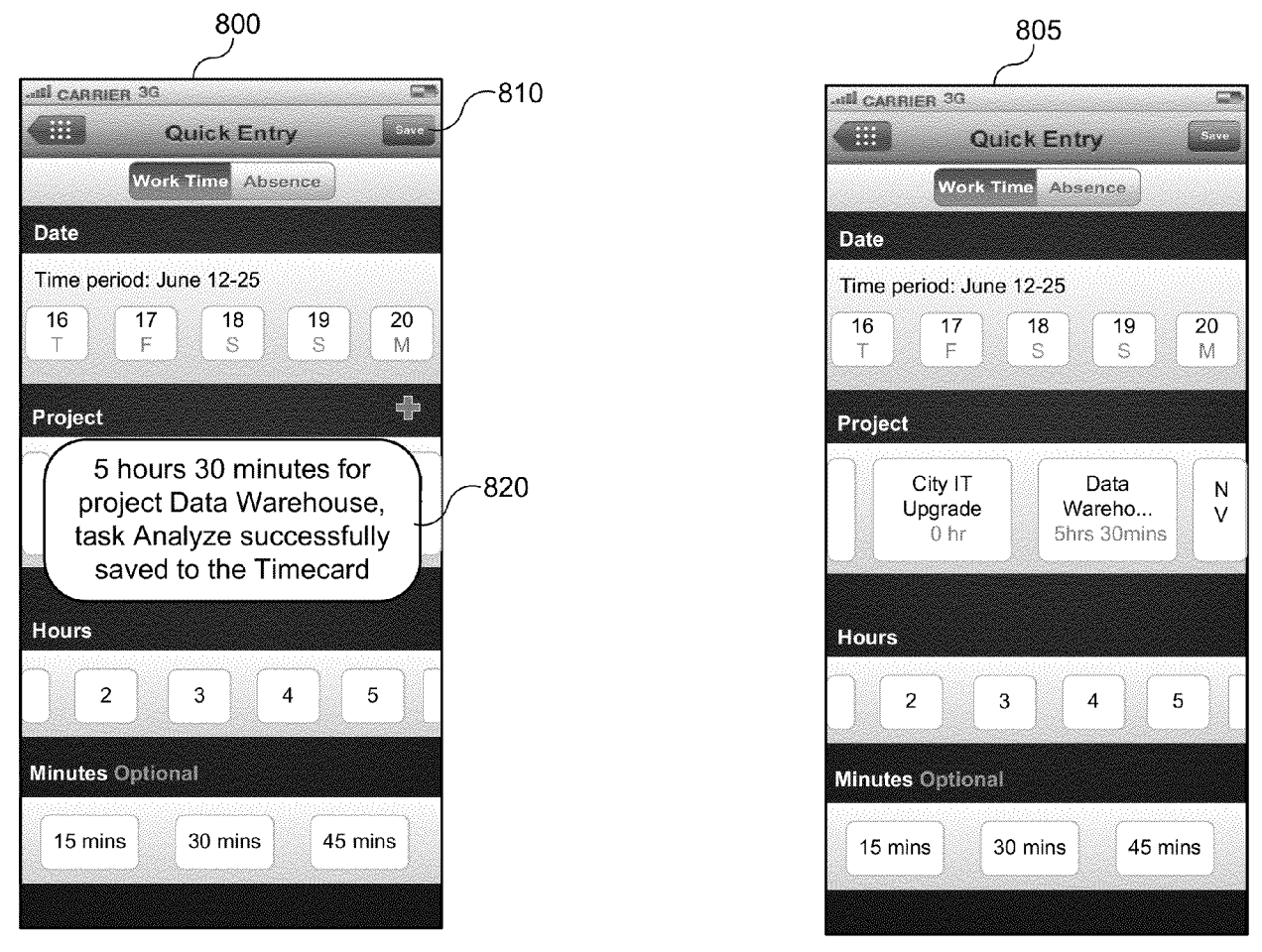

FIG. 8 illustrates an interface for storing data selections, according to one embodiment. Once all of the selections have been made in each data lane, the interface 800 may receive an input from a save button 810 to save the data selections. Generally, one or more value selections corresponding to each selected icon may be stored as a value of the attribute associated with each data lane. In one embodiment, the save button 810 is disabled until a selection has been made in each data lane. However, in another embodiment, the save button 810 is made active when a minimum threshold of values have been selected. In yet another embodiment, receiving a save button 810 input without having selected a minimum number of values may exit the quick data entry interface and save the state, such that when the interface was again selected from the main menu, the interface would revert to the last-saved state.

After the save button 810 receives an input (preferably from a finger-tap input) the interface 800 may display and message 820 to the user indicating that the data was successfully stored. Different embodiments may display varying amounts of data in the message 820. The embodiment of FIG. 8 displays an amount of time that was stored to a particular project. Other embodiments may display additional buttons that allow for additional inputs. For example, the message 820 may ask for a confirmation that the data entered is correct before it is saved, or the message 820 may include a prompt for additional information. After the data is saved, the interface may revert back to its starting state, as shown by interface 805, such that the data entry process may start again. In another embodiment, instead of clearing the selections from the interface 805, the user may be taken back to a main menu and the quick data entry interface may be exited.

Turning back briefly to FIG. 7, the "Minutes" data lane in this embodiment is marked with a label 760 indicating that selecting a value/icon for this data category is optional. An optional data lane may be left unselected when the save button 810 receives a finger-tap input. In some embodiments, when optional data lanes are left blank, the value for that attribute is left blank. However, in another embodiment, when an optional data lane is left blank, the value may be filled in with a default value. For example, if the "Minutes" data lane is left unselected when the save button 810 receives an input, the "Minutes" attribute may be saved with a default value of "00" indicating that five hours and zero minutes are to be charged to the "Data Warehouse Upgrade" project.

Figure 9:
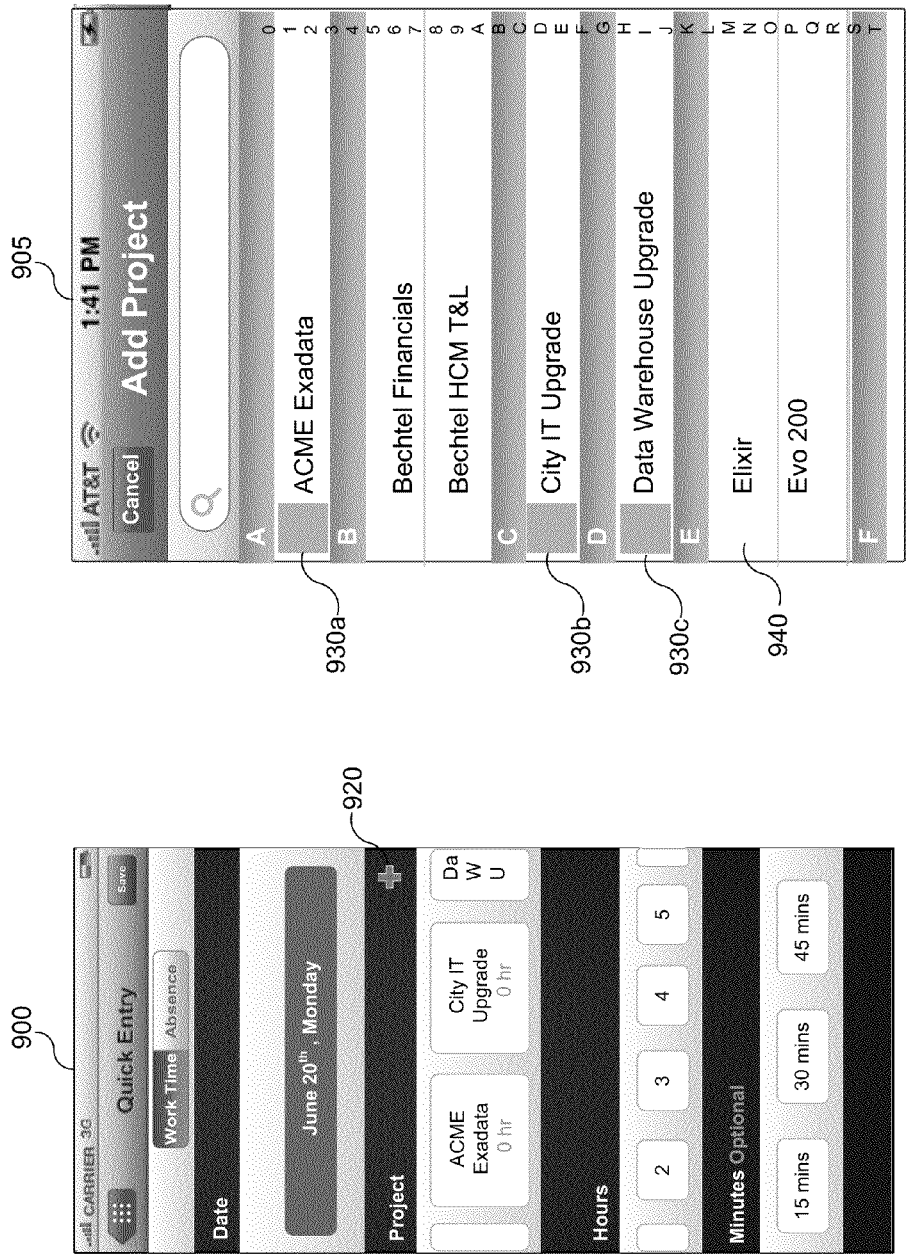
FIG. 9 illustrates an interface for adding a value to a data lane, according to one embodiment.

When the quick data entry interface is first loaded, each of the data lanes may be loaded with default attributes and values. In some embodiments the most commonly used attributes and values may be loaded as default values. In another embodiment, the most recently used attributes and values may be loaded into the data lanes. If the user wishes to add more values to a data lane, some embodiments provide this option for certain attributes. FIG. 9 illustrates a method of adding a value to a data lane, according to one embodiment. Data lanes for which more values are available may include a button 920 that allows a user to add more values to the data lane. For example, the button may be a "+" symbol, as shown by button 920. When selected, the user may be taken to a separate interface, or a new window may open on top of a portion of the quick data entry interface 900.

The new window or interface 905 may bring up list of possible values that may be added to the particular data lane. Merely by way of example, the "+" button 920 in the "Project" data lane may call interface 905, which contains an alphabetical listing of the various projects that the user may be authorized to charge time to. Projects 930 that are already listed in the data lane may be marked or otherwise highlighted to indicate such. In this case, the "ACME Exadata" project 930*a*, the "City IT Upgrade" project 930*b*, and the "Data Warehouse Upgrade" project 930*c* may be highlighted with an icon to indicate that they are already in the data lane. Using a finger tap input, a user may select an additional project, such as the "Elixir" project 940 to add to the interface 900. After selecting the additional project, the new window 905 may close and the display may revert back to the interface 900, which may display the newly added project 940 in the "Project" data lane.

Figure 10:
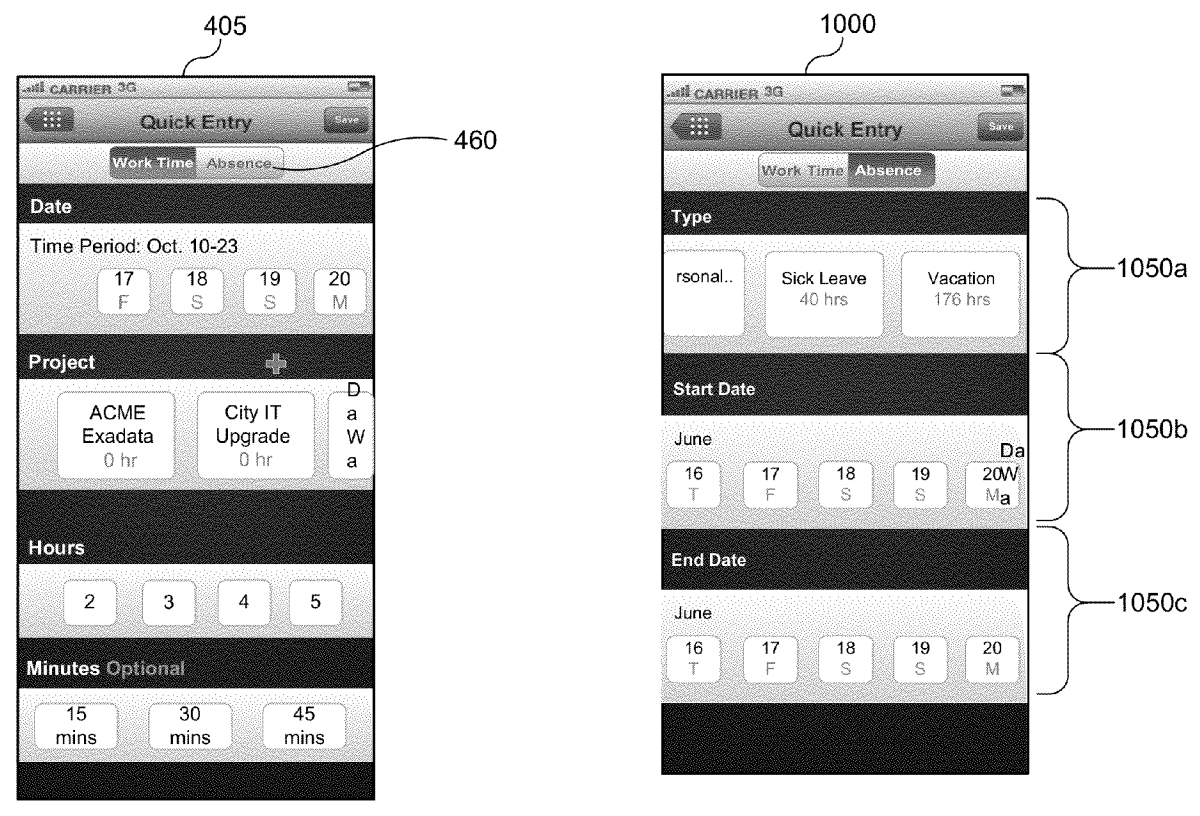

Many of the embodiments discussed thus far have been concerned with recording time for projects; however, these scenarios are merely illustrative. Many other types of data entry applications may be implemented by embodiments of this invention. FIG. 10 illustrates another example of a data entry application according to one embodiment. Here, the quick data entry interface 405 may be switched from a "Work Time" interface to an "Absence" interface 1000 using the toggle 460. In the absence interface 1000, the toggle 460 has been switched to display data lanes that pertain to recording data related to work place absences. By way of example, the absence interface 1000 includes a "Type" data lane 1050*a*, a "Start Date" data lane 1050*b*, and an "End Date" data lane 1050*c*. Values from each of these lanes may be selected in a manner similar to the way that values were selected in the examples using the "Work Time" interface 405 discussed above.

Figure 11:
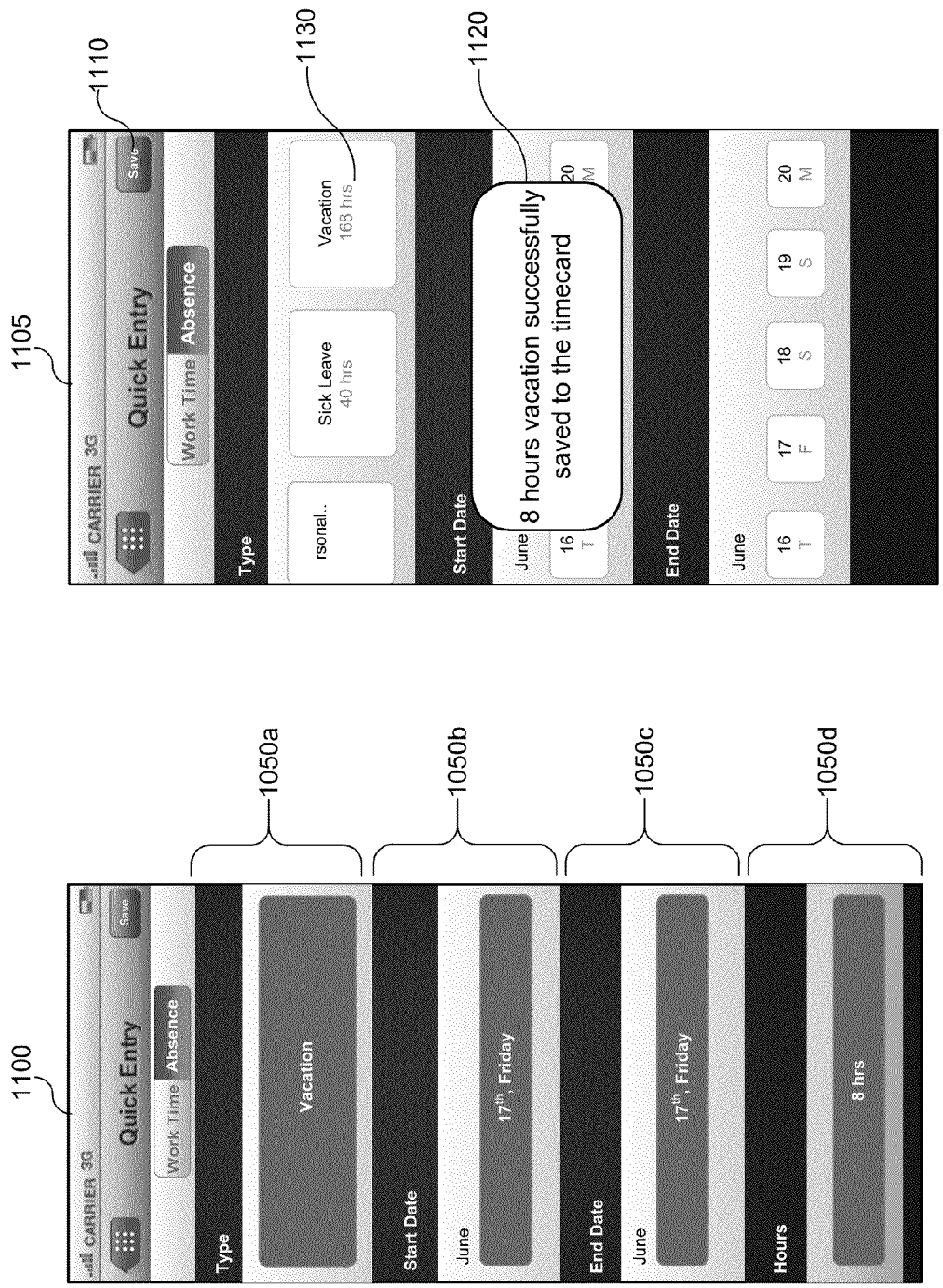
FIG. 11 illustrates an interface for saving selections made for an interface, according to one embodiment.

FIG. 11 illustrates an interface for saving selections made for the interface 1000, according to one embodiment. Interface 1100 shows an example of a user selecting values for each of the data lanes 1050. The "Hours" data lane 1050*d* was not visible in the absence interface 1000 of FIG. 10. In one embodiment data lane 1050*d* was available if the interface 1000 were to receive a vertical scrolling input, such as an upward finger gesture towards the top of the interface 1000. In another embodiment, data lane 1050*d* could be added dynamically in response to a selection of a certain value in one of the preceding data lanes. After the save button 1110 receives an input, the values in each of the data lanes may be saved in the same manner as was described for previous examples. A message 1120 specific to the data being saved may be displayed on the interface 1105. For example, message 1120 displays the type of absence recorded (vacation) and the amount of time saved to that absence. Also, each of the types of absences displayed in data lane 1050*a* may show an update number 1130 representing the total amount of time charged to each type of absence during a relevant time period. This may allow a user to better determine where future hours should be charged, particularly when the user desires to balance his/her absence time between various activities.

Figure 12:
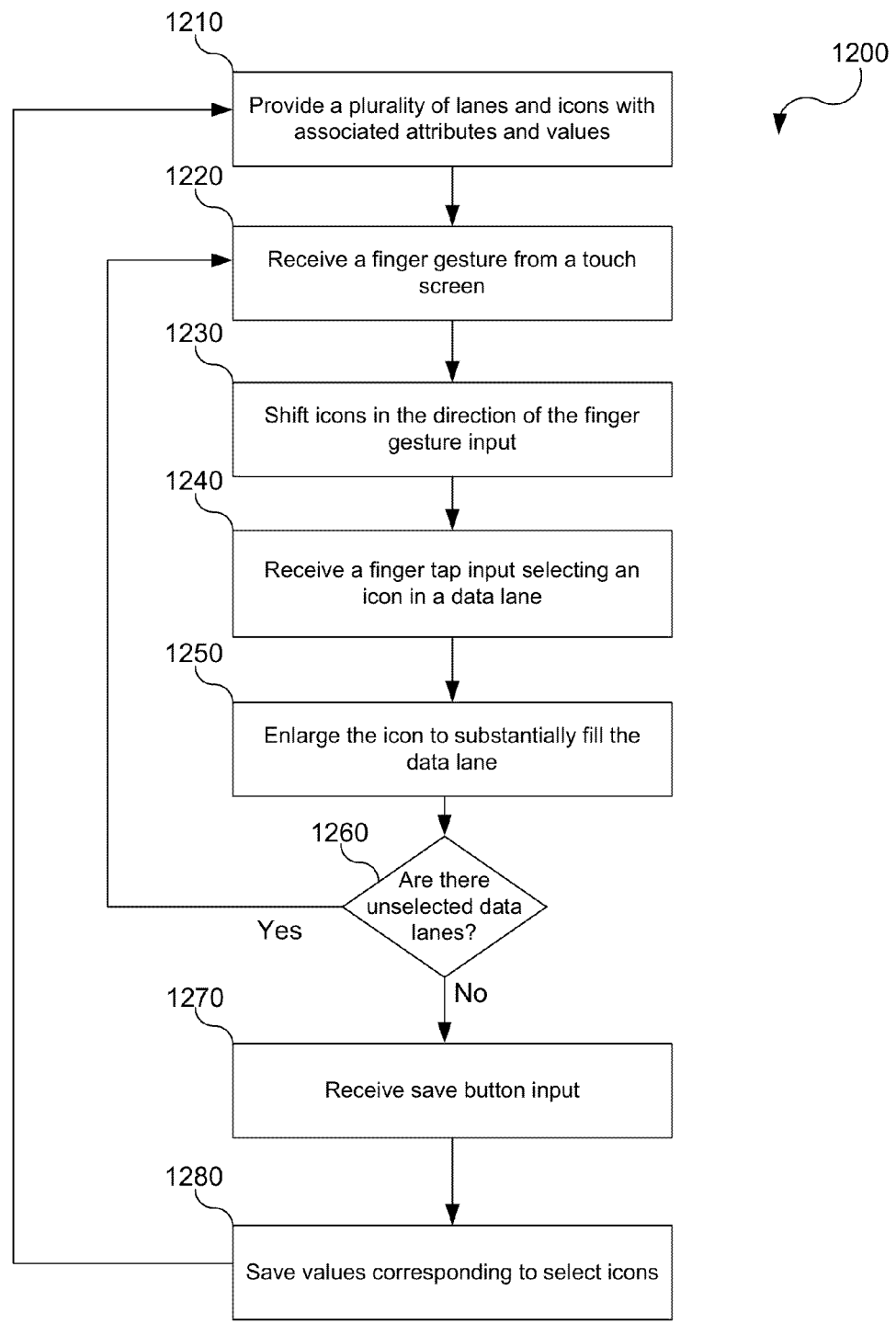
FIG. 12 illustrates a flowchart of a method for interpreting a data selection input on a touch screen, according to one embodiment.

FIG. 12 illustrates a flowchart 1200 of a method for interpreting a data selection input on a touch screen, according to one embodiment. At process block 1210, an interface may be provided with one or more data lanes. Each data lane may be associated with an attribute, and each attribute may be associated with at least one value that may be assigned to the attribute. The values for each data lane may be associated with icons that are configured to graphically represent the values to a user, along with any other information that a user may find useful in selecting a value.

At process block 1220, one of the data lanes may receive a finger gesture input with a directional component. In response, the icons within the data lane may be shifted in the direction of the finger gesture input such that some of the icons may be shifted off of the view of the display at process block 1230, such that some of the icons may be shifted into the view of the display. Note that if all of the icons may be displayed on the interface at the same time, then this step may be skipped or otherwise altered. At process block 1240, the touch screen may receive a finger tap input or an equivalent input in another form that indicates the selection of an icon within the data lane. At process block 1250, the selected icon may be enlarged to substantially fill the data lane, or otherwise highlighted to indicate that a selection has been made. At this point, if the selected icon is de-selected with a subsequent finger tap input, then the selected icon may return to its original size and the process may return to process block 1220 or process block 1240.

At decision block 1260, it may be determined whether there are any data lanes where a selection of a value has not been made. If the unselected data lanes remain, then the interface may wait for the additional selections to be made in accordance with process block 1220. However, if selections have been made in each data lane, then the interface may receive an input from a save button at process block 1270 and then save the values to corresponding to each attribute as determined by the selected icons at process block 1280. In light of this process, it will be understood that the ordering of these method steps may be rearranged according to particular embodiments, and that each step may include additional steps that have been discussed in other portions of this disclosure.

The invention has now been described in detail for the purposes of clarity and understanding. However, it will be appreciated that certain changes and modifications may be practiced within the scope of the appended claims.

What is claimed is:

1. A method of interpreting a data selection according to an input received on a touch screen, the method comprising:
   providing an interface on the touch screen comprising:
      a plurality of lanes, wherein each lane is associated with an attribute, wherein each attribute is associated with a plurality of values;
      a plurality of icons in each lane, wherein each icon is configured to display one of the plurality of values of the attribute associated with each lane; wherein at least a portion of the plurality of icons in each lane is displayed on the touch screen; and
      a first lane in the plurality of lanes wherein a first icon is not displayed;
   determining, using a processor, that a finger gesture input from the touch screen has a direction and is associated with the first lane in the plurality of lanes;
   in response to the finger gesture input, moving the plurality of icons in the first lane in the direction of the finger gesture input such that the first icon is displayed on the touch screen;
   determining, using the processor, that a finger tap input from the touch screen corresponds to the first icon;
   in response to the finger tap input, enlarging a size of the first icon on the touch screen to substantially fill the first lane
   receiving subsequent finger tap inputs from the touch screen, each of which selects one of the icons in the plurality of lanes;

enlarging each selected icon to substantially fill each lane with an icon selected by a finger tap;

presenting a view of the enlarged selected icons together in their respective lanes as a summary data selection;

receiving a second finger tap input indicating that the summary data selection is approved for submission; and submitting the values corresponding to each selected icon.

2. The method of interpreting a data selection according to claim 1, wherein each lane extends from a first edge of the touch screen to an opposite edge of the touch screen.

3. The method of interpreting a data selection according to claim 1, wherein each lane is a horizontal row.

4. The method of interpreting a data selection according to claim 1, wherein the plurality of icons in each lane are linearly arranged within each lane.

5. The method of interpreting a data selection according to claim 1, wherein the interface further comprises displaying in each lane a name of the attribute associated with the lane.

6. The method of interpreting a data selection according to claim 1, wherein each attribute relates to recording time spent on a project.

7. The method of interpreting a data selection according to claim 1, wherein each attribute relates to recording time absent from an occupation.

8. The method of interpreting a data selection according to claim 1, further comprising:

after enlarging the size of the first icon, determining that a second finger tap input from the touch screen corresponds to the first icon;

in response to the second finger tap input, reducing the size of the first icon on the touch screen to an original size.

9. The method of interpreting a data selection according to claim 1, further comprising adding a second lane with an associated attribute to the plurality of lanes, wherein the attribute associated with the second lane is determined at least in part by the finger tap input.

10. A system for storing a data selection, the system comprising:

a touch screen;

one or more processors;

a memory operatively coupled to the one or more processors, the memory having sets of instructions stored thereon which, when executed by the one or more processors, cause the one or more processors to:

provide an interface on the touch screen comprising:

a plurality of lanes, wherein each lane is associated with an attribute, wherein each attribute is associated with a plurality of values; and a plurality of icons in each lane, wherein each icon is configured to display one of the plurality of values of the attribute associated with each lane; wherein at least a portion of the plurality of icons in each lane is displayed on the touch screen;

receive a plurality of finger tap inputs from the touch screen, wherein each finger tap input corresponds to one of the icons in the plurality of lanes;

in response to each finger tap input, enlarge a size of the corresponding icon within each lane with an icon selected by a finger tap;

present a view of all of the enlarged selected icons together in their respective lanes as a summary data selection;

receive a subsequent finger tap input indicating that the data selection is complete; and in response to the subsequent finger tap input, store, in the memory, the values that each icon corresponding to the finger tap inputs is configured to display.

11. The system for storing a data selection according to claim 10, wherein enlarging the size of the icon within each lane comprises enlarging the icon such that it fills at least 50% of a display area of its respective lane.

12. The system for storing a data selection according to claim 10, wherein enlarging the size of the icon within each lane comprises enlarging the icon such that it fills at least 60% of a display area of its respective lane.

13. The system for storing a data selection according to claim 10, wherein enlarging the size of the icon within each lane comprises enlarging the icon such that it fills at least 75% of a display area of its respective lane.

14. The system for storing a data selection according to claim 10, wherein the interface on the touch screen further comprises a data lane associated with a project attribute, and each icon associated with a specific project in the data lane is configured to display an amount of time billed to that project.

15. The system for storing a data selection according to claim 10, wherein the interface on the touch screen further comprises an add icon in at least one data lane, wherein the add icon is configured to receive an input, and wherein in response to receiving the input, the interface is configured to add additional icons associated with additional values to the data lane.

16. A non-transitory computer-readable medium for storing a data selection, the computer-readable medium having sets of instructions stored thereon which, when executed by a computer, cause the computer to:

provide an interface on a touch screen comprising:

a plurality of lanes arranged in horizontal rows, wherein each row extends from a first vertical edge of the touch screen to an opposite vertical edge of the touch screen, wherein each lane is associated with an attribute having a name, and wherein each attribute is associated with a plurality of values;

a title display in each lane configured to display a graphical representation of the name of the attribute associated with each lane; and a plurality of icons arranged linearly within each lane, wherein each icon is configured to graphically represent one of the plurality of values of each attribute associated with each lane;

receive additional selections of icons for additional lanes;

enlarge the selected icons for the additional lanes to substantially fill each of the additional lanes;

present a view of all of the enlarged selected icons together in their respective lanes as a summary data selection;

receive a second finger tap input indicating that the summary data selection is approved for submission; and submit the values corresponding to each selected icon.

17. The non-transitory computer-readable medium for storing a data selection according to claim 16, wherein enlarging the selected icon for lane to substantially fill each lane comprises an animated expansion to a larger size.

18. The non-transitory computer-readable medium for storing a data selection according to claim 16, wherein the sets of instructions further cause the computer to remove any unselected icons from each lane in response to receiving the selection of an icon in each lane.

19. The non-transitory computer-readable medium for storing a data selection according to claim 16, wherein the sets of instructions further cause the computer to:

horizontally scroll the plurality of icons in each lane according to a finger gesture input with a horizontal motion component; and disable the horizontal scrolling in each lane in response to receiving the selection of an icon for each lane.

20. The non-transitory computer-readable medium for storing a data selection according to claim 16, wherein:
- each icon in the plurality of icons has a size, the size depending upon an amount of information represented by each icon's value; and
- each lane displays a subset of the plurality of icons for each lane, a number of icons in the subset determined by the size of the icons.

* * * * *

UNITED STATES PATENT AND TRADEMARK OFFICE
CERTIFICATE OF CORRECTION

| | |
|---|---|
| PATENT NO. | : 8,990,261 B2 |
| APPLICATION NO. | : 13/972507 |
| DATED | : March 24, 2015 |
| INVENTOR(S) | : Liu et al. |

Page 1 of 1

It is certified that error appears in the above-identified patent and that said Letters Patent is hereby corrected as shown below:

In the claims

In column 16, line 64, in claim 1, delete "lane" and insert -- lane; --, therefor.

Signed and Sealed this
Third Day of November, 2015

Michelle K. Lee
*Director of the United States Patent and Trademark Office*